(12) United States Patent
Sage

(10) Patent No.: US 6,228,281 B1
(45) Date of Patent: May 8, 2001

(54) SIZING FOR GLASS FIBERS HAVING LOW NONIONIC AND CATIONIC LUBRICANT CONTENT

(75) Inventor: Donald B. Sage, Amarillo, TX (US)

(73) Assignee: Owens Corning Fiberglas Technology, Summit, IL (US)

( * ) Notice: Subject to any disclaimer, the term of this patent is extended or adjusted under 35 U.S.C. 154(b) by 0 days.

(21) Appl. No.: 09/182,462

(22) Filed: Oct. 30, 1998

(51) Int. Cl.⁷ .................. C03C 17/28; C03C 17/30; D06M 13/00; D06M 15/643
(52) U.S. Cl. .................. 252/8.83; 252/8.84; 65/443; 65/444; 65/448; 8/115.6; 524/186; 524/261; 525/29; 525/101
(58) Field of Search .................. 252/8.83, 8.84; 65/443, 444, 448; 8/115.6; 524/186, 261; 525/29, 101

(56) References Cited

U.S. PATENT DOCUMENTS

| | | | |
|---|---|---|---|
| 2,873,718 | 2/1959 | Brautigam | 118/234 |
| 3,664,855 | * 5/1972 | Morrison et al. | 428/403 |
| 4,166,872 | * 9/1979 | Karpik et al. | 242/159 |
| 4,244,844 | * 1/1981 | Molinier et al. | 524/53 |
| 4,246,145 | * 1/1981 | Molinier et al. | 524/53 |
| 4,294,416 | 10/1981 | Beckman | 242/477 |
| 4,656,084 | 4/1987 | McCoy et al. | 428/266 |
| 4,762,751 | 8/1988 | Girgis et al. | 428/378 |
| 4,795,678 | 1/1989 | Girgis | 428/391 |
| 4,927,869 | 5/1990 | Dana et al. | 523/502 |
| 5,009,941 | 4/1991 | Pollet et al. | 428/36.3 |
| 5,286,562 | 2/1994 | Girgis | 428/391 |
| 5,334,639 | 8/1994 | Rice | 524/47 |
| 5,393,335 | 2/1995 | Puckett et al. | 106/211 |
| 5,605,757 | 2/1997 | Klett | 428/392 |
| 5,665,470 | 9/1997 | Key et al. | 428/378 |

FOREIGN PATENT DOCUMENTS

| | | |
|---|---|---|
| 255859 | * 2/1988 | (EP) . |
| WO 94 25522 | 11/1994 | (WO) . |
| WO 96 23023 | 8/1996 | (WO) . |
| WO 98 53979 | 12/1998 | (WO) . |

OTHER PUBLICATIONS

Derwent Publications Ltd, XP002131032 and JP 57 111265 A, (Jul. 10, 1982).

Derwent Abstract No. 1978–53880A, abstract of German Patent Specification No. 2802243 (Jul./1978).*

* cited by examiner

Primary Examiner—Anthony Green
(74) Attorney, Agent, or Firm—Inger H. Eckert

(57) ABSTRACT

A sizing composition for coating glass and carbon fibers. The composition comprises low concentrations of a cationic and nonionic lubricant, a film-forming polymer, and preferably a coupling agent and a hydrolyzing agent. Use of the sizing composition reduces fuzz development, increases wettability, and improves roving package stability.

14 Claims, No Drawings

SIZING FOR GLASS FIBERS HAVING LOW NONIONIC AND CATIONIC LUBRICANT CONTENT

TECHNICAL FIELD AND INDUSTRIAL APPLICABILITY OF THE INVENTION

The present invention relates to a sizing composition for coating glass or other fibers derived from amorphous material. These fibers may be used, for example, in pultrusion or filament winding operations to reinforce polymeric materials, or are used in a knitting or weaving process to produce reinforced fabric. More specifically, the invention is a composition having low levels of nonionic and cationic lubricant additives that is used to effectively coat glass, carbon or aramid fibers. This coating endows the fibers with enhanced properties such as reduced fuzz development and improved roving package stability.

BACKGROUND OF THE INVENTION

The reinforced plastic industry has historically used glass fibers in the form of continuous or chopped fibers, strands and rovings to reinforce polymer matrices used in making a wide range of products. In particular, glass fibers, as well as woven and non-woven fabrics, meshes and scrims have been added to thermosetting polymer matrices for use in pultrusion, filament-winding, spray-up, sheet molding and bulk molding operations.

In the pultrusion process, for example, a reinforced composite is formed when a thermosetting polymer or a hot thermoplastic polymer is forced between the fibers of a glass roving as it is pulled through a coating apparatus, profiling and alignment dies. In this manner, the fibers are impregnated with the polymer resin, and the resin and fibers are shaped into the form of the composite. In turn, these impregnated composites are cured by heating continuously. The glass fibers, strands and rovings used in the pultrusion operation are made from molten fiberizable material that is introduced into a bushing or like device. The bushing is equipped with small apertures to allow passage of thin streams of the molten material. As the molten material emerges from the bushing apertures, each stream is attenuated and pulled downward to form a long, continuous fiber. The continuously forming fibers may be gathered into strands for winding. Winding is accomplished by attaching the strands to a mechanism such as a winder or pull wheel, and then winding the fibers onto spools or reels. The rate at which the winder pulls the fiber determines its width, with more rapid attenuation creating thinner fibers of smaller diameter, and a slower speed generating thicker fibers. The rate of attenuation also affects the movement of the filaments through the fiber-forming process, and therefore also affects the amount of any coating material deposited on the surface of the moving fibers. The forming packages or doffs formed by the above-described winding operation are then ready for use in composite-making operations such as pultrusion or filament winding.

Several difficulties have been associated with the use of continuous fibers and the rovings made from these fibers. A major problem with the use of wound rovings is the breakage of the individual fibers during winding, unwinding or handling of the strands. Inter-filament abrasion of the fibers causes them to break, and as a result loose ends are separated from the fiber strands. These loose, broken ends form a roughened layer or fuzz on the surface of the fibers. Fuzz may also develop when fibers break during the weaving process. This fuzz is undesirable because it affects the appearance of the woven product. Breakage of the fibers also results in build-up of fuzz on the contact points and other surfaces of the processing machinery. This fuzz buildup in turn is exacerbated by static electricity. Also, the fuzz often becomes airborne, and thus becomes a source of skin and respiratory irritation to some workers handling the fiber strands. The fuzz may also collect to form tufts or balls of broken fibers, which then jam the processing equipment or fall into the resin baths used for dipping the fiber strands.

It has long been recognized that, in order to reduce fuzz, it is advantageous to provide a light coating known as a size or size coating onto the surface of the glass or carbon fibers after they have been attenuated from the bushing. The size coating is particularly desirable when the fibers are to be used as reinforcing elements in resinous articles. The size coating reduces fuzz and improves processing properties of the fibers such as fiber bundle cohesion, spreadability, fiber smoothness and softness, abrasion resistance and ease in unwinding the fiber bundles. The compositions are further used to make the glass fibers compatible with the polymer matrices to which they are added as a reinforcing component.

The size may be applied to the fibers in an on-line operation immediately after they are formed, or they may be applied off-line to unwound fiber strands that were previously formed and packaged. Preferably, the fibers are wet with the sizing composition as soon as they are formed from the bushing. The application of the composition at this early stage helps to protect the fibers from damage during handling. The sizing is applied by conventional means, then dried onto the surface of the fibers. Heat may be used to dry and/or cure the coating.

Generally, sizing agents can be divided into two types, the solvent type and the emulsion type. Non-aqueous solvent type size compositions include a low-boiling organic solvent combined with the ingredients to form a solution that is applied to the fibers. In emulsion sizing agents, the resin and other ingredients are dispersed in water to form an emulsion, which is then applied to the filaments. The filaments are dried to provide a uniform coating of the sizing agent. Chemical sizing compositions have traditionally been aqueous solutions, foams or gel compositions containing a film-forming polymer, coupling or keying agent, and lubricant.

Typically, the focus in the art has been concentrated on developing sizing compositions that either maximize the amount of coating on the fibers to reduce fuzz; or on eliminating undesirable features of coated roving, such as tackiness or flaking. As a result, the sizing compositions that are usually used in the art to reduce fuzz formation include high levels of lubricants or other ingredients. Coatings as exemplified by U.S. Pat. Nos. 5,393,335, 5,605,757, 5,665,470, 5,334,639, 5,286,562, 4,795,678, 4,762,751, relate to sizing compositions for treating glass fibers having one or more ingredients such as lubricants, emulsifiers, humectants, coupling agents or natural or synthetic polymers. However, the high levels of lubricants traditionally used in these size coatings routinely result in over-lubrication of the strands or rovings. When these over-lubricated rovings are wound, the forming packages become unstable because of slippage of the strands. The rovings may also be squeezed together during the packaging, thus changing the height of the doff. As a result, the formed packages are not of uniform height, and they cannot be stacked or palleted for efficient storage. Rather, stacking pallets with unevenly sized packages may cause the pallets to collapse, thereby jeopardizing worker safety. The lack of uniform size may also result in the packages not being able to fit onto apparatus used to mold or form composites. Use of higher amounts of lubricants has also increased the costs associated with the sizing operation.

Another problem related to the use of sizing compositions is incompatibility between the sizing composition and the polymer matrix used to form the composites. The art has attempted in several ways to solve the problem of incompatibility between the fibers and the polymer composite material into which they are implanted, including the development of compositions containing curing or coupling agents. However, there remains a recognized need for a coupling agent that facilitates intimate bonding between the glass fibers and the polymer matrix.

There exists then a need for a sizing composition that will provide an effective coating to reduce fuzz, while improving rather than decreasing the stability of the roving package. Further, a sizing composition that yields an effective coating, but at the same time requires a low concentration of ingredients is desirable because waste is minimized.

SUMMARY OF THE INVENTION

It is therefore an object of this invention to provide a composition which, when used to coat reinforcing fiber rovings, reduces fuzz development and at the same improves the stability of the forming packages. The term stability as it is used here is intended to mean a condition in which substantially no slippage of the sized rovings occurs when they are wound onto the reels; and in which the forming packages are of a consistent and uniform size that permits them to be stably stacked onto pallets, or which makes the packages compatible with apparatus designed for composite molding. It is also an object of this invention to produce a sizing composition that is cost-effective to make and use.

More specifically, it is an object of this invention to provide a sizing composition having low levels of cationic and nonionic lubricants, wherein the combination of these lubricants at the prescribed levels is compatible with polymers used for coating the fibers and for making the composite articles. The composition of this invention is suitable for coating reinforcing fibers selected from the group consisting of reinforcing glass, carbon or aramid fibers.

It has now surprisingly been found that when low concentrations of an alkoxylated polyalkylene glycol monoester lubricant and a partially amidated polyalkylene imine cationic lubricant are combined with a film-forming polymer, such that the lubricant concentrations are lower than those previously contemplated by the prior art, the resulting sizing composition is effective in reducing fuzz and in stabilizing the fiber roving package. The concentration of the glycol monoester lubricant of this invention ranges from about 0.15% to about 1.5% by weight. The cationic lubricant is present in an active weight amount of from about 0.01% to about 0.1% by weight. These amounts are based on the weight of a mixture of the active ingredients in water. Other components of the sizing composition may include a coupling agent, a hydrolyzing agent for hydrolysis of the coupling agent and other conventional additives and processing aids.

The compositions are typically formulated by blending the individually premixed ingredients to form a concentrate, then diluting this concentrate to provide an aqueous dispersion. The ingredients such as the film-forming polymer, the coupling agent, the hydrolyzing agent, the lubricants and processing aids are used in amounts effective to formulate a stable aqueous dispersion having a storage stability of up to about 72 hours at temperatures of from about 50° F. to about 120° F., and a pH of from about 3.5 to about 5.0.

Another aspect of this invention is a method of treating the reinforcing fibers comprising the steps of formulating an aqueous sizing composition comprising low concentrations of a cationic lubricant and a nonionic lubricant; and contacting one or more reinforcing fibers with the sizing composition. The sizing can be applied to fibers as they are attenuated from a bushing apparatus conventionally used in fiber production.

DETAILED DESCRIPTION OF THE PREFERRED EMBODIMENTS OF THE INVENTION

A particularly desirable aspect of the invention is the combination of certain cationic and nonionic lubricants in low concentrations, such that the desired effects of increased resistance to fuzz development, good wetting ability, and at the same time, improved roving package stability, are achieved.

The cationic lubricant useful in the invention is selected from the group consisting of partially amidated long-chain polyalkylene imines. The partially amidated polyalkylene imines usually have a residual amine value of from about 200 to about 800 and are reaction products of a mixture of about $C_2$ to about $C_{18}$ fatty acids with a polyethylene imine having a molecular weight from about 800 to about 50,000. The amines suitable for forming the fatty acid salt of this reaction product are preferably tertiary amines of substantially low molecular weight, for example with the alkyl groups attached to the nitrogen atom having from about 1 to about 6 carbons. Preferably, the fatty acid moiety of the salt preferably includes from about 12 to about 22 carbon atoms. Most preferably, the partially amidated polyalkylene imine is a condensation reaction product of polyethylene imine with a fatty acid selected from the group consisting of pelargonic and caprylic acids, which for example is commercially available from Henkel Inc. under the trademark EMERY 6760T.

The amount of the cationic lubricant required for successful practice of this invention is an amount sufficient to provide a level of the active lubricant that will form a coating with low fuzz development, while yielding excellent roving package stability. An excessive amount of this ingredient is undesirable because at high levels, poor package build and deformation of the product results. The amount of partially amidated polyalkylene imine cationic lubricant in the size coatings of this invention may therefore preferably vary from about 0.01% to about 0.1% active weight, in an aqueous formulation of the composition. This amount is low enough to provide an effective coating without any of the adverse effects of using a higher concentration. Preferably, the active weight of the cationic lubricant is from about 0.05% to about 0.07% weight.

The nonionic lubricant is a polyoxyalkylated polyalkylene glycol ester, such as a fatty acid monoester. Preferably, the nonionic lubricant of this invention is an alkoxylated polyethylene glycol fatty acid ester. An example of a preferred ester is an ethoxylated polyethylene glycol fatty acid monoester. A particularly preferred nonionic lubricant is a mono-oleate ester having about 400 ethylene oxide groups, marketed commercially as PEG 400 MO by Henkel Chemicals. The concentration of the glycol monoester lubricant in the sizing compositions of the invention ranges from about 0.15% to about 1.5% by weight, with a range of about 0.60% to about 0.81% by weight being preferred. Most preferably, the active weight of nonionic lubricant is about 0.76% weight.

Optimally, a combination of about 0.76% weight of the monoester lubricant and about 0.01% active weight of the cationic lubricant may be used. These amounts are based on the weight of a mixture of the active sizing composition in water.

The film-forming polymer component of the composition may be selected from polymers known in the art as useful in film coating of glass and carbon fibers. Some examples of these film-forming polymers include resins such as epoxies, polyamides, polyesters, polyvinyl acetates, styrenated acrylics, phenolics, melamines, nylons, acrylics, PVC, polyolefins, polyurethanes and nitrile rubbers.

Optionally, the sizing composition also includes one or more additives selected from the group consisting of coupling agents, wetting agents and hydrolyzing agents.

The coupling agents preferably used in this invention have hydrolyzable groups that can react with the glass surface to remove unwanted hydroxyl groups; and one or more groups that can react with the film-forming polymer to chemically link the polymer with the glass surface. Preferably, the coupling agent is one that has 1–3 hydrolyzable functional groups that can interact with the surface of the glass fibers, and one or more organic groups that are compatible with the polymer matrix. The preferred coupling agents of this invention include compounds selected from the group consisting of organosilanes. Examples of hydrolyzable groups associated with these organosilanes include vinylic, amino and imino groups such as:

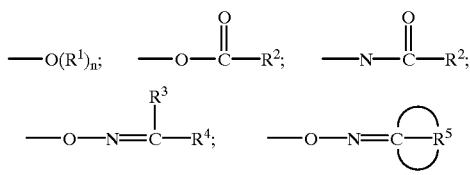

and the monohydroxy and/or cyclic $C_2$–$C_3$ residue of a 1,2- or 1,3-glycol, wherein $R^1$ is H or $C_1$–$C_3$ alkyl; $R^2$ is H or $C_1$–$C_4$ alkyl; $R^3$ and $R^4$ are independently selected from H, $C_1$–$C_4$ alkyl or $C_6$–$C_8$ aryl; and $R^5$ is $C_4$–$C_7$ alkylene; and n is an integer from 1 to 3. The organosilanes of this invention are preferably those which produce 1–3 hydroxyl groups for bonding at the inorganic glass surface to form O—Si—O bonds, and which also possess at least one organic group for binding to the matrix resin. Some examples of the organosilanes defined above include 3-amino-propyldimethylethoxysilane, gamma-aminopropyltriethoxysilane, gamma-aminopropyltrimethoxysilane, beta-aminoethyltriethoxysilane, N-beta-aminoethylaminopropyltrimethoxysilane, gamma-isocyanatopropyltriethoxysilane, vinyl-trimethoxysilane, vinyl-triethoxysilane, allyl-trimethoxysilane, mercaptopropyltrimethoxysilane, mercaptopropyltriethoxysilane, glycidoxypropyltrimethoxysilane, 4,5-epoxycyclohexylethyltrimethoxysilane, ureidopropyltrimethoxysilane, ureidopropyltriethoxysilane, chloropropyltrimethoxysilane and chloropropyltriethoxysilane. Mixtures of two or more of these organosilanes may be used.

Particularly preferred organo functional silane coupling agents for the practice of this invention include vinylic silanes, which are useful in unsaturated resins; and amino silanes, which are useful promoters or coupling agents for resins such as epoxies, phenolics, melamines, nylons, acrylics, PVC, polyolefins, polyurethanes and nitrile rubbers. In one preferred embodiment, the organosilane ingredient is a mixture of a methacrylato-silane, most preferably gamma-methacryloxypropyltrimethoxysilane (a vinylic silane also known commercially as A-174); and an amino silane, most preferably gamma-aminopropyltriethoxysilane (A-1100). A-174 and A-1100 are commercially available, for example from Witco Chemical Co.

The wetting agent is added to facilitate contact between the dispersion and the fiber surface. Any conventional wetting agent that is compatible with the other ingredients of the sizing composition can be used. In the preferred embodiment, the wetting agent is mono-pentaerythritol, at a concentration of about 0.10% to about 0.15% weight.

A hydrolyzing agent may also be included to hydrolyze one or more of the coupling agents. Suitable hydrolyzing agents include hydrochloric, acetic, formic, citric, oxalic and phosphorous acids. Preferably, an effective concentration of acetic acid is used to carry out the hydrolyzing step. For example, about 0.21% weight of acetic acid may often be sufficient.

The sizing compositions of the invention are formulated as a concentrate, with the appropriate poundage per gallon based on the percentage weight of active solids in each ingredient. The ingredients are each premixed in a tank with demineralized water and agitated for the appropriate period of time necessary to achieve a homogenous dispersion or solution. The premixed ingredients are then fed to a mix tank and agitated. Demineralized water is added as required to provide the desired mix-solids concentration. The mix solids concentration may vary from about 2% to about 12% by weight in the aqueous dispersion. Preferably, the total amount of mix solids is about 6.5% weight, based on the weight of the total dispersion.

The finished mixture typically has a pH of between 3.5 and 5.0. The composition can generally be stored for up to 72 hours at a temperature of between about 65–85° F. without deleterious effect.

The aqueous sizing composition can be applied to the reinforcing fibers by any method known to those skilled in the art. In the preferred embodiment, the composition is applied to glass fibers after they have been attenuated from a fiber-forming bushing. Fibers exiting the bushing may be passed through a coating apparatus where the sizing treatment is applied, or the composition may otherwise be contacted with the fibers according to methods familiar to one skilled in the art. For example, the coating may be applied to the surface of the fibers by spraying, dipping, roll-coating, or other coating means known in the art. After the sizing is applied, the fibers may be gathered into strands or rovings and wound to build a forming package.

As one means of building the forming package, glass fibers attenuated from the fiber-forming bushing are combined into one or more strands as they are turned onto or passed through a gathering apparatus. A winder located below the gathering apparatus simultaneously collects the strands onto a rotating collet. The strands are thus formed into a cylindrical forming package. The rate of attenuation of the fibers and the rate of winding can be controlled so as to create a uniformly wound package having a desirable size. The winding operation may also be modified such that more than one forming package can be wound at the same time from the strands attenuating from the bushing. The forming packages can then be used in combination with a desired polymer matrix material to form composites and composited articles.

Glass fiber reinforced polymer matrices are commonly used outdoors or in corrosive environments. Applications for pultruded composites include ladder rails, sucker rods, antennae, railings, conduits, I-beams, H-beams and channel angles. Clear or translucent reinforced plastic panel applications include solar collectors, skylights, artificial light fixture covers, patio covers, and highway signs and markings. The composites may also be used in pigmented reinforced sheet molding compound (SMC) applications, such as satellite dishes, showers, bath tubs, automotive body panels, valve covers, spoilers and bumpers.

EXAMPLES

To formulate the composition, each of the ingredients was first premixed in demineralized water maintained at a temperature of 75±5° F. The amount of water placed in the premix tank was varied according to the ease of dispersion of the ingredients. The premix was agitated sufficiently to provide a homogenous solution or dispersion, and then added to the main mix tank. Compatible ingredients were optionally premixed together in a master batch before being added to the main tank. The mixed ingredients were agitated together in the main mix tank for about 5 minutes, after which the mix solids were checked. Demineralized water was added to the concentrate formed in order to adjust the level of mix solids to a level that would provide the targeted level of strand solids. This level was typically from 5.5% to 6.9% by weight, based on the weight of the dispersion.

The following exemplary formulations are representative of the invention:

Example 1

| Material | % Active solids[a] | % by weight as received | Lb./100 gallons as received[c] | Kg/100 liters as received[c] | % Active Concentration[d] |
|---|---|---|---|---|---|
| FFP | 56 | 7.01 | 58.37 | 6.995 | 3.906 |
| A-174 | 68 | 0.97 | 8.10 | 0.97 | 0.658 |
| A-1100 | 58 | 0.24 | 2.02 | 0.242 | 0.140 |
| Acetic Acid[b] | 100 | 0.21 | 1.72 | 0.206 | 0.206 |
| PEG 400 MO | 100 | 0.64 | 5.37 | 0.643 | 0.642 |
| EMERY 6760T | 12.5 | 0.20 | 1.67 | 0.200 | 0.050 |
| Mono PE[b] | 100 | 0.10 | 0.87 | 0.105 | 0.104 |
| DM Water | 0 | 90.62 | 754.88 | 90.466 | — |

[a]Percentage weight solids used to calculate the predicted size mix solids.
[b]Master premix is allowed for acetic acid, Emery 6760 and Mono PE.
[c]As received, mix solids are calculated at 5.50%.
[d]Concentration of active species in the sizing composition.
FFP - film-forming polymer emulsion, for example an emulsion of DOW-337, Dow Chemical Inc.
A-174 - gamma-methacryloxypropyltrimethoxysilane, Witco Chemical Co.
A-1100 - preferably gamma-aminopropyltriethoxysilane, Witco Chemical Co.

Example 1

| Material | % Active solids[a] | % by weight as received | Lb./100 gallons as received[c] | Kg/100 liters as received[c] | % Active Concentration[d] |
|---|---|---|---|---|---|
| FFP | 56 | 6.98 | 58.11 | 6.964 | 3.924 |
| A-174 | 68 | 0.97 | 8.06 | 0.966 | 0.661 |
| A-1100 | 58 | 0.24 | 2.01 | 0.241 | 0.141 |
| Acetic Acid[b] | 100 | 0.21 | 1.71 | 0.205 | 0.206 |
| PEG 400 MO | 100 | 0.64 | 5.35 | 0.641 | 0.645 |
| EMERY 6760T | 12.5 | 0.40 | 3.33 | 0.399 | 0.025 |
| Mono PE[b] | 100 | 0.10 | 0.87 | 0.104 | 0.105 |
| DM Water | 0 | 90.46 | 753.57 | 90.309 | — |

It is believed that Applicant's invention includes many other embodiments which are not herein specifically described, accordingly this disclosure should not be read as being limited to the foregoing examples or preferred embodiments.

I claim:

1. A sizing composition for coating fibers comprising from 0.01 to about 0.1 percent weight of a cationic lubricant wherein the cationic lubricant is a partially amidated polyalkylene imine and from about 0.15 to about 1.5 percent weight of a nonionic lubricant wherein the nonionic lubricant is a polyoxyalkylated polyalkylene glycol ester.

2. The composition of claim 1, wherein the nonionic lubricant is ethoxylated polyethylene glycol mono-oleate.

3. The composition of claim 1 wherein the amidated polyalkylene imine cationic compound is a condensation product of polyethylene imine with a fatty acid selected from the group consisting of pelargonic and caprylic acids.

4. The composition of claim 1, further comprising a coupling agent.

5. The composition of claim 4, wherein the coupling agent comprises one or more compounds selected from the group consisting of vinylic silanes, amino silanes and mixtures thereof.

6. The composition of claim 5, wherein the vinylic silane coupling agent is selected from the group consisting of acrylate- and methacrylate-substituted silanes.

7. The composition of claim 6, wherein the vinylic silane coupling agent is gamma-methacryloxypropyltrimethoxysilane.

8. The composition of claim 5, wherein the amino silane coupling agent is gamma-aminopropyltriethoxysilane.

9. The composition of claim 8, wherein the coupling agent is a mixture of gamma-methacryloxypropyltrimethoxysilane and gamma-aminopropyltriethoxysilane.

10. The composition of claim 1, further comprising a wetting agent.

11. The composition of claim 10, wherein the wetting agent is mono-pentaerythritol.

12. The composition of claim 10 further comprising a hydrolyzing agent for hydrolyzing the coupling agent.

13. The composition of claim 12, wherein the hydrolyzing agent is acetic acid.

14. A sizing composition for coating fibers comprising:
a) from about 0.64 to about 0.81 percent weight of nonionic lubricant which is an ethoxylated polyethylene glycol mono-oleate;
b) from about 0.050 to about 0.063 percent weight of a cationic lubricant which is a partially amidated polyalkylene imine compound;
c) from about 0.65 to about 0.83 percent weight of a methacrylate-based organosilane coupling agent; and
d) from about 3.9 to about 4.1 percent weight of an emulsion of an epoxy film-forming polymer.

* * * * *